July 8, 1958            F. L. HAAKE            2,842,392
PARACHUTE DISCONNECTING DEVICE
Filed Aug. 29, 1955
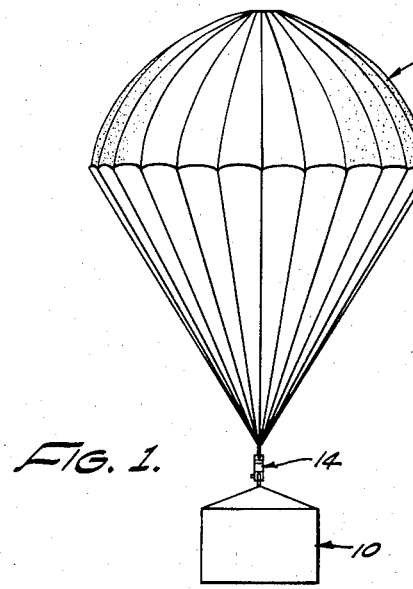
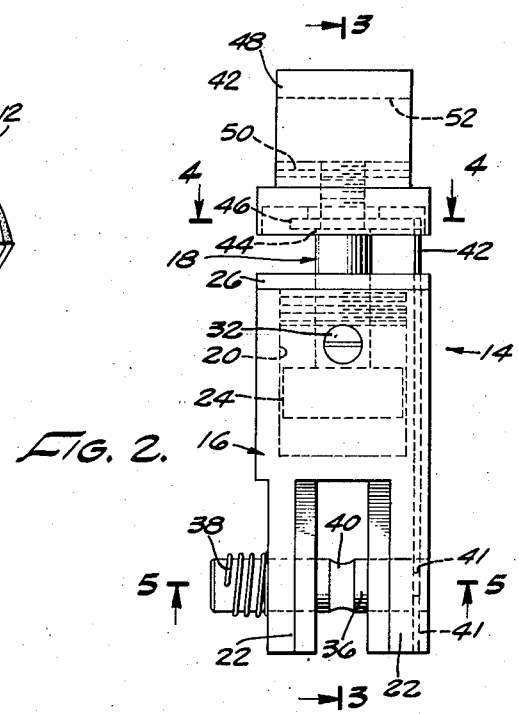
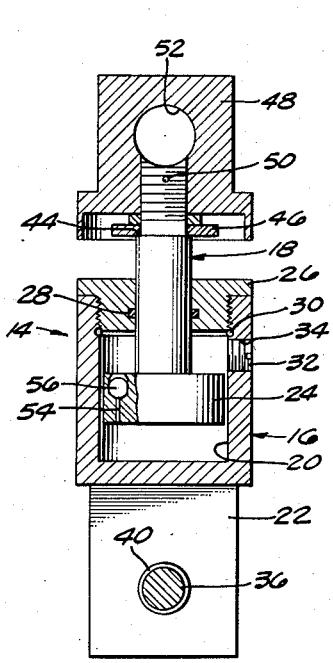
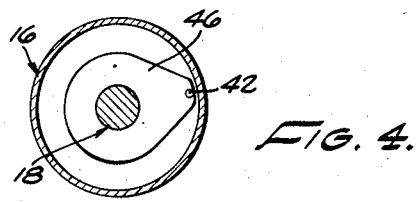
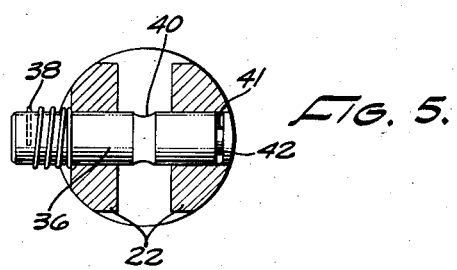
FREDERICK L. HAAKE
INVENTOR.
BY
ATTORNEYS

United States Patent Office 2,842,392
Patented July 8, 1958

2,842,392
PARACHUTE DISCONNECTING DEVICE
Frederick L. Haake, Oxnard, Calif.
Application August 29, 1955, Serial No. 531,234
4 Claims. (Cl. 294—83)

This invention relates to a parachute disconnecting device.

It is an object of this invention to provide a separable connector between a load and its support upon a predetermined reduction in the pulling force of the latter.

It is a further object of this invention to provide such a separable connector which will function only upon expiration of a predetermined period of time.

It is still a further object of this invention to provide means for disconnecting a parachute from its load upon the engagement of the latter with the ground.

It is still a further object of this invention to provide means for disconnecting a parachute from its load only after expiration of a predetermined period of time to prevent disconnection during the period of stabilization as the parachute and load descend.

It is still a further object of this invention to provide a separable connector which is light weight and compact and which can be repeatedly used.

It is still a further object of this invention to provide a separable connector which permits free swivel of a parachute and its load.

Other objects and advantages will be readily apparent from the following description:

In the drawings:

Figure 1 is a side elevation illustrating the parachute and load.

Figure 2 is a side elevation of the separable connector.

Figure 3 is a section taken along line 3—3 of Figure 2.

Figure 4 is a section taken along line 4—4 of Figure 2.

Figure 5 is a section taken along line 5—5 of Figure 2.

Referring first to Figure 1, a load 10 is illustrated supported by parachute 12, the two being connected by a separable connector 14. This invention is directed primarily to the separable connector 14 illustrated in detail in the remaining figures of the drawings.

The separable connector comprises generally a cylinder 16 connected to the load 10, and a piston 18 connected to the parachute 12. Referring first to the cylinder 16, same is formed with a piston chamber 20 at the upper extremity and a clevis 22 at the lower extremity. The piston chamber 20 receives piston head 24 mounted upon the extremity of piston 18. The chamber is closed by a cap 26 which receives piston 18 and suitable O-rings 28 and 30 are supplied to prevent leaking. A plug 32 is threaded to screw into access opening 34 of the cylinder to permit introduction of a suitable fluid into the chamber.

The clevis 22 has a hole through each leg thereof to receive clevis pin 36 which has a groove 40 formed therein to accommodate suitable means for suspending load 10 from the clevis pin. The outer extremity of the clevis pin 36 has a spring 38 mounted thereon urging the pin transversely out of engagement with the clevis. The spring has the extremity furthest from the clevis projecting into a suitable aperture in the pin 36. To secure the clevis pin in the clevis same is provided at the extremity opposed to the spring bearing extremity with an external annular groove 41, which receives locking pin 42 which in turn is supported in a suitable bore in cylinder 16.

Referring now to the piston 18, same is provided with a shoulder 44, upon which plate 46 is rotatably supported which in turn supports the upper extremity of pin 42 in any suitable manner. Thus the piston 18 may rotate with respect to the cylinder 16 and pin 42. The piston 18 is threaded to receive cap 48 which is locked thereto by pin 50. The cap has a hole 52 therein by which the parachute 12 is secured to the connector 14.

In operation suitable fluid is introduced into piston chamber 20. The piston head 24 has a bore 54 therein with the upper end enlarged to trap ball 56 therein forming a one-way valve. The outer diameter of the piston head is slightly smaller than the inner diameter of the chamber 20 permitting flow from one side of the piston head to the other. When fluid enters the chamber 20 above piston head 24 as seen in Figure 3, the connector is charged. Then the parachute is connected to the piston 18 and the load to the cylinder 16. Upon release of the load and opening of the parachute the lock pin 42 is held in engagement with clevis pin 36. The load exerts a downward pressure on cylinder 16 which lowers with respect to piston 18, the rate of movement between the piston and cylinder being controlled by the clearance therebetween and the viscosity of the fluid. When the cylinder has moved its full distance with respect to the piston the locking pin 42 has been extracted from groove 40 releasing clevis pin 36. It is desirable to adjust the period of time during which the cylinder is moving relative to the piston to more than the time required for the parachute to open and stabilize, which is approximately three to eight seconds to avoid premature release of the load.

After locking pin 42 has been released from groove 40 the weight of the load will hold the clevis pin 36 in clevis 22 because of friction. However, when the load reaches the ground then its pulling force will be reduced or eliminated and spring 38 will urge the pin 36 out of the clevis 22, releasing the parachute from the load to prevent dragging or other injury thereto.

While what hereinbefore has been described is the preferred embodiment of this invention, it is readily apparent that alterations and modifications of this invention may be resorted to without departing from the scope of this invention and such alterations and modifications are intended to be included within the scope of the appended claims.

I claim:

1. A device for separably connecting a parachute and its load comprising: a piston connected to said parachute, said piston fitting within a cylinder, a clevis connected to said cylinder, a clevis pin insertable into said clevis and supporting said load, and a safety pin mounted upon said piston locking said clevis pin into said clevis, said safety pin being withdrawn upon relative movement of said piston and cylinder.

2. A device for separably connecting a parachute and its load comprising: a piston connected to said parachute, said piston fitting within a cylinder, a clevis connected to said cylinder, a clevis pin insertable into said clevis and supporting said load, a safety pin mounted upon said piston locking said clevis pin into said clevis, said safety pin being withdrawn upon relative movement of said piston and cylinder, and spring means urging said clevis pin out of said clevis to release said load from said parachute.

3. A device for separably connecting a parachute and its load comprising: a piston connected to said parachute, said piston fitting within a cylinder, a clevis connected to said cylinder, a clevis pin insertable into said clevis and supporting said load, a safety pin mounted upon said piston locking said clevis pin into said clevis, said safety pin being withdrawn upon relative movement of said piston and cylinder, spring means urging said clevis pin out of said clevis to release said load from said parachute, said spring means urging said clevis pin out of said clevis operative only upon a reduction of the pulling force of the load.

4. A device for separably connecting a parachute and its load comprising: a piston connected to said parachute, said piston fitting within a cylinder, a one-way valve in said piston, a clevis connected to said cylinder, a clevis pin insertable into said clevis and supporting said load, and a safety pin mounted upon said piston locking said clevis pin into said clevis, said safety pin being withdrawn upon relative movement of said piston and cylinder.

References Cited in the file of this patent

UNITED STATES PATENTS

| | | |
|---|---|---|
| 2,131,445 | Lawton | Sept. 27, 1938 |
| 2,424,215 | Anderson | July 22, 1947 |
| 2,490,558 | Sullivan | Dec. 6, 1949 |
| 2,667,376 | Schlachter | Jan. 29, 1954 |